Oct. 6, 1959  D. MESSENGER ET AL  2,907,608
ARTICULATED LINK UNITS
Filed May 2, 1957
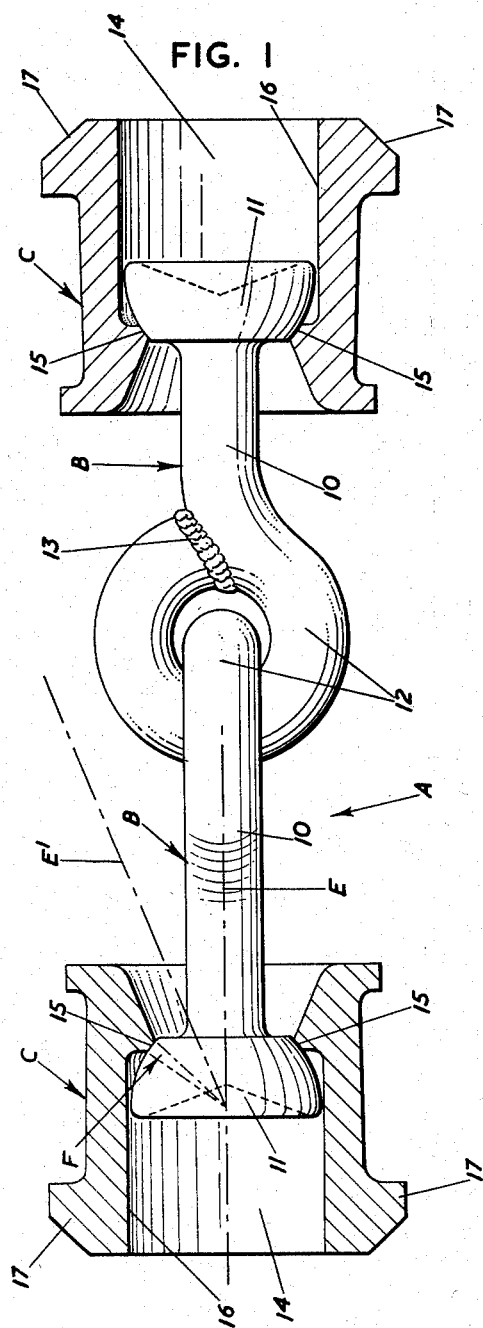
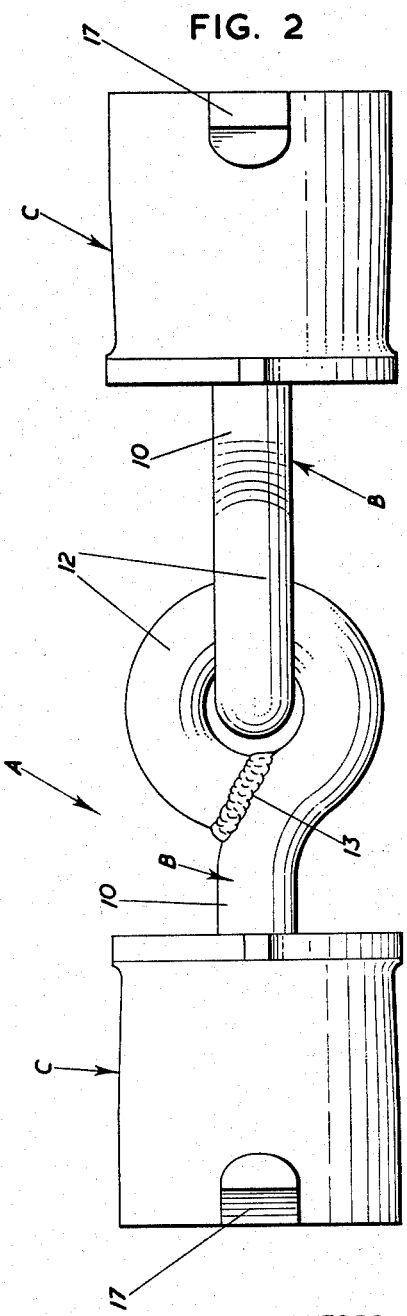
INVENTORS
DESMOND MESSENGER
GLEN W. PHELPS
BY: Fetherstonhaugh & Co
ATTORNEYS

United States Patent Office 2,907,608
Patented Oct. 6, 1959

2,907,608

ARTICULATED LINK UNITS

Desmond Messenger and Glen W. Phelps, Orillia, Ontario, Canada, assignors to The Track Corporation Limited, Ontario, Canada Application May 2, 1957, Serial No. 656,659

3 Claims. (Cl. 305—10)

This invention relates to articulated link units for endless traction treads for wheeled vehicles, of the general kind disclosed in United States Patent No. 2,735,730, and method of making same.

Endless traction tread elements employing articulated link units such as disclosed in the aforementioned patent have proven to be very efficient. In some instances, however, wear does occur between coacting bearing surfaces of the links and the bushings which accordingly require replacement from time to time. This wear may be ascribed generally to the fact that since the traction elements intimately contact and in some cases embed in the ground they receive between the co-acting bearing surfaces mineral particles which may be harder than the metal of these surfaces. Consequently, when they are retained between these surfaces abrasive action is set up as to promote wear. The present invention seeks to avoid this accelerated wear caused by this condition as well as to provide a durable, simple and economic structure. In this instance, the bearing surfaces have been so formed as to tend to discharge abrasive particles which may enter between the bearing surfaces rather than to retain them and effect a continuing grinding or abrasive wear condition. The preferred form of construction includes a bushing element formed from ductile iron incorporating a small percentage of molybdenum in combination with links of multiple alloy steel such as chrome steel specially heat treated to produce an articulated link unit having great wearing properties and satisfactory impact resistance for normal life expectancy, the bushing having a hardness greater than the minimum of the Rockwell "C" scale and an impact resistance greater than the minimum of the impact resistance range, created by a heat treatment suitable for the steel alloy links of the assembled unit and in accordance with the method hereinafter defined.

The invention generally comprises an articulated link structure having a pair of links formed with eyelets at one end inter-engaged with one another in articulated connection, said links at their opposite ends having an enlarged partly spherical bearing element, and a bushing to receive each enlarged end of each link in articulated relation, each said bushing being formed with an internal circumferentially extending bearing seat spaced inwardly from the interior wall of said bushing for cooperative bearing engagement with the enlarged bearing surface of the cooperating link, said internal bearing seat being such that the angle of articulation of its cooperating link from its mean position is greater than the angle subtended by said bearing seat. Preferably each bushing is formed from ductile iron and each link from a hardenable steel, said links and bushings when united as a unit being heat treated to produce a unit having great wearing properties and satisfactory impact resistance for normal life expectancy.

The invention will be clearly understood by reference to the following specification taken in conjunction with the accompanying drawings.

In the drawings:

Fig. 1 is a sectional elevation of a link unit with the bushings shown in section to illustrate the specific characteristics of the structure; and Fig. 2 is a side elevation of the link structure shown in Fig. 1 rotated 90° comparatively to Fig. 1.

Referring to the drawings, A indicates a link unit as a whole which is generally made up of interengaged articulated links B and bushings C in articulated connection with the links B. The links take the form of shanks 10 having an enlarged partly spherical bearing element 11 at one end and which are bent to form an eyelet 12 at the opposite end. The eyelet 12 initially is formed like a hook-like member, the links being interengaged as shown between the hook members and the latter finally being welded as at 13 to produce a non-detachable articulated connection between each pair of links which form part of each unit A. Each link B, however, is first of all united in articulated bearing connection with its bushing C, i.e. the link is passed through the bushing prior to the articulated interengagement of each link to form the final link unit. In this respect the bushing C is formed with a passageway 14 therethrough which at its inner end is restricted by an inwardly directed circumferentially extending bearing seat 15, the seat being spaced inwardly from the interior wall 16 of the bushing and being preferably formed with a partly spherical bearing surface adapted to engage the partly spherical bearing surface of the enlarged end 11 of the cooperating link.

The bearing surface of bearing seat 15 is particularly narrow in extent and at a maximum its width is such that the angle of articulation of the link B formed between its mean position E to position E1 is greater than the angle F subtended by said seat. However, it may be even narrower in extent. Accordingly, since the links when incorporated in an endless traction unit intimately contact and in some cases embed in the ground, hard mineral particles in the latter which may be harder than the metal of the bearing surfaces and which temporarily enter between such bearing surfaces will usually be discharged from this location as the bearing surfaces articulate with respect to one another. This is in contrast to being maintained between a bearing contact of greater extent such as illustrated in the aforementioned patent, and which otherwise would result in wear of the bearing surfaces by such abrading action and which tends to cause accelerated wear. Accordingly, this construction will avoid undue wear of this character which often results in premature link unit failure.

Preferably the bushing elements C are formed from ductile iron of known formulation and which incorporates a predetermined percentage of molybdenum, while the links are formed from hardenable steel such that heat treatment of the steel to obtain the desired hardness characteristics will have the result of producing in the ductile iron bushing a hardness above the minimum of the Rockwell "C" scale and an impact resistance which is within the impact resistance range of that produced in the steel by the heat treatment. We have found for this purpose it is preferable to employ for the bushing a ductile iron formulation incorporating at least .5 percent molybdenum. As an example of the method employing bushings formed from a known ductile iron formulation and incorporating .5 percent molybdenum, these may be joined with links to form a link unit in which the links have the following formula:

.40 carbon
.75 manganese
.03 max. phosphorous
.03 max. sulphur
.20 silicon
.60 chromium
1.25 nickel
.15 molybdenum.

The articulated link unit of this composition is given a normalizing heat treatment up to 1600° F. and air cooled for one hour, after which it is subjected to a heat treatment of 1550° F. and oil quenched and is drawn at 450 to 500° F. and air cooled. Following this treatment it is tumbled in fine shot for four hours minimum. In result, a link unit is produced having great wearing properties and satisfactory impact resistance for normal life expectancy. For links of other steel formula, the degree of heat is varied according to the formula of the steel.

The bushings C of the unit, as shown in Figs. 1 and 2, are preferably formed with the projecting lugs 17 such that they may be inserted in a bayonet joint socket of a metal traction member and rotated for securement such as is illustrated in the prior patent above specified.

The resulting link unit is most durable in character and wear resistant to a maximum degree. Greater wear would normally occur in the articulated connection between the links rather than the articulated connection between the bushings and the links. In fact, however, little movement results in the articulated connection between the links since the links are extended tautly over a major portion of their travel in the endless traction unit of which they form part while by reason of the narrow character of the bearing seat 15 which promotes a minimum of frictional resistance, the links themselves have a tendency to rotate relatively to the bushings with the result that little articulation between the links occurs. Finally, by reason of hardness and impact resistance achieved in the bushings of ductile iron by heat treatment suitable for the hardenable steel links and which achieve a more practical working combination in action, economic advantages of manufacture also result. Accordingly, this construction of simple nature provides a number of beneficial advantages as to produce a link unit of great practicability.

What we claim as our invention is:

1. An articulated link structure for securing the tracks of an endless traction unit for vehicles comprising a pair of links having eyelets at one end interengaged with one another in articulated connection, said links at their opposite ends having an enlarged partly spherical bearing element, and a bushing to receive each enlarged end of each link in articulated relation, each said bushing being formed with an internal circumferentially extending bearing seat spaced inwardly from the interior wall of said bushing for cooperative bearing engagement with said enlarged bearing element of the cooperating link, said internal bearing seat being of such narrow width that the angle of articulation of its cooperating link measured from a position in which the link is longitudinally aligned with the cooperating bushing is greater than the angle subtended by said bearing seat.

2. An articulated link structure for securing the tracks of an endless traction unit for vehicles comprising a pair of links having eyelets at one end interengaged with one another in articulated connection, said links at their opposite ends having an enlarged partly spherical bearing element, and a bushing to receive such enlarged end of each link in articulated relation, each said bushing being formed with an inwardly disposed annular bearing surface adjacent one end of the bushing spaced inwardly from the interior wall of said bushing, said annular bearing surface having a partially spherical contour to cooperate with that of the enlarged bearing element of the cooperating link and of such width that the angle of articulation of the cooperating link measured from a position in which the link is longitudinally aligned with the cooperating bushing is substantially greater than the angle subtended by said bearing surface.

3. An articulated link structure for securing the tracks of an endless traction unit for vehicles comprising a pair of links having eyelets at one end interengaged with one another in articulated connection, said links at their opposite ends having an enlarged partly spherical bearing element, and a bushing to receive each enlarged end of each link in articulated relation, each said bushing being formed with an inwardly disposed circumferentially extending bearing seat adjacent one end of the bushing and projecting inwardly from the interior wall of said bushing, said seat being very narrow in width such that the angle of articulation of each link measured from a position in which the link is longitudinally aligned with the cooperating bushing greatly exceeds the angle subtended by said seat.

References Cited in the file of this patent

UNITED STATES PATENTS

| 1,873,312 | Douglas | Aug. 23, 1932 |
| 2,105,048 | Lavenstein et al. | Jan. 11, 1938 |
| 2,157,153 | Troche | May 9, 1939 |
| 2,210,357 | Beament | Aug. 6, 1940 |
| 2,455,307 | Irvin | Nov. 30, 1948 |
| 2,693,673 | Lutts et al. | Nov. 9, 1954 |
| 2,735,730 | Messenger et al. | Feb. 21, 1956 |

OTHER REFERENCES

Metals Handbook, 1948, published by The American Society for Metals, pp. 301, 302, 631, 632, 633, 634, 635.

Metals Handbook, 1948 edition by American Society for Metals, pp. 304, 644, 645.

Metal Progress, July 15, 1954 (1954 Supplement to Metal Handbook), pp. 49–52.